(12) United States Patent
Srinivasan et al.

(10) Patent No.: US 12,470,404 B2
(45) Date of Patent: Nov. 11, 2025

(54) SYSTEMS AND METHODS FOR PERFORMING CERTAIN COMMUNICATION FUNCTIONS IN A NON-CERTIFIED COMPUTER

(71) Applicant: Honeywell International Inc., Charlotte, NC (US)

(72) Inventors: Divya Swarup Giriyappa Srinivasan, Bangalore (IN); John Azariah Rajadurai, Bangalore (IN); Thomas D. Judd, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 164 days.

(21) Appl. No.: 18/465,751

(22) Filed: Sep. 12, 2023

(65) Prior Publication Data

US 2025/0047503 A1  Feb. 6, 2025

(30) Foreign Application Priority Data

Jul. 31, 2023  (IN) .............................. 202311051387

(51) Int. Cl.
*H04L 9/32* (2006.01)
(52) U.S. Cl.
CPC .................. *H04L 9/3263* (2013.01)
(58) Field of Classification Search
None
See application file for complete search history.

(56) References Cited

U.S. PATENT DOCUMENTS

| | | | |
|---|---|---|---|
| 6,677,888 B2 | 1/2004 | Roy | |
| 9,596,289 B2 | 3/2017 | Bolling | |
| 10,798,033 B2 | 10/2020 | Judd et al. | |
| 11,159,640 B2 | 10/2021 | Shamasundar et al. | |
| 11,257,379 B2 | 2/2022 | Shamasundar et al. | |
| 2005/0181787 A1* | 8/2005 | Judd | H04L 9/40 |
| | | | 455/431 |
| 2009/0058682 A1 | 3/2009 | True | |
| 2018/0357561 A1* | 12/2018 | Selvarajan | H04L 12/66 |
| 2019/0312935 A1 | 10/2019 | Selvarajan et al. | |

OTHER PUBLICATIONS

European Patent Office, "Extended European Search Report", dated Dec. 10, 2024, from EP Application No. 24187455.1 from Foreign Counterpart to U.S. Appl. No. 18/465,751, pp. 1 through 10, Published: EP.

* cited by examiner

*Primary Examiner* — Brandon Hoffman
(74) *Attorney, Agent, or Firm* — Fogg & Powers LLC

(57) ABSTRACT

Techniques are provided for facilitating less expensive and more rapid implement and modification of processes, e.g., communications processes, performed in a vehicle, e.g., a commercial aircraft, by implementing those functions on a non-certified computer. This is because the non-certified computer and the functions which it performs do not require certification by a government entity. Optionally, the non-certified computer is communicatively coupled to a communications management unit which requires certification from the government entity. Optionally, the non-certified computer may be an electronic flight bag for commercial aviation applications.

20 Claims, 3 Drawing Sheets

SYSTEMS AND METHODS FOR PERFORMING CERTAIN COMMUNICATION FUNCTIONS IN A NON-CERTIFIED COMPUTER

BACKGROUND

Components of commercial aircraft require certification from government entities, e.g., the U.S. Federal Aviation Agency and/or its counterparts in other countries, prior to deployment. Such aircraft components requiring certification may include a communications management unit (CMU), radio(s), and other on-aircraft system(s). Certification of such components is time consuming and costly. Rapid modification of functionality, currently performed by such aircraft component(s) which require certification, is desired. This desire arises from either customer demands to customize such functionality or to promptly correct flaws in the functionality which may cause safety issues for an aircraft.

CROSS-REFERENCE TO RELATED APPLICATION

This application claims priority to Indian application No. 202311051387 filed on Jul. 31, 2023 and titled "SYSTEMS AND METHODS FOR PERFORMING CERTAIN COMMUNICATION FUNCTIONS IN A NON-CERTIFIED COMPUTER", the contents of which are incorporated herein in its entirety.

SUMMARY

In some aspects, the techniques described herein relate to a method for processing uplink data or downlink data, the method including: receiving, at a non-certified computer configured to be mounted in a vehicle and from a communications management unit (CMU) configured to be mounted in the vehicle and to route data between components of the vehicle, and that requires certification by a government entity, first data including either (a) a message of a message type or (b) (i) information configured to form or extracted from the message of the message type and (ii) a message type identifier, wherein the message type means a type of message of a set of message types, wherein the non-certified computer does not require the certification by the government entity; determining, with the non-certified computer, whether the message type identifier was received; determining, with the non-certified computer, that the message type identifier was not received, then identifying the message type; determining, with the non-certified computer, whether the first data includes data configured to be transmitted off the vehicle; determining, with the non-certified computer, that the first data includes data configured to be transmitted off the vehicle, then, using the message type identifier, at least one of encoding, encrypting, and compressing at least a portion of the first data to create the downlink data; transmitting the downlink data from the non-certified computer to the CMU; determining, with the non-certified computer, that the first data does not include data configured to be transmitted off the vehicle, then, using the message type identifier, at least one of decoding, decrypting, and decompressing the at least a portion of the first data to create the uplink data; and transmitting the uplink data from the non-certified computer to the CMU.

In some aspects, the techniques described herein relate to a non-transitory computer readable medium storing a program causing at least one processor of a non-certified computer to execute a process for processing uplink data or downlink data, the process including: receiving, at the non-certified computer configured to be mounted in a vehicle and from a communications management unit (CMU) configured to be mounted in the vehicle, configured to route data between components of the vehicle, and that requires certification by a government entity, first data including either (a) a message of a message type or (b) (i) information configured to form or extracted from the message of the message type and (ii) a message type identifier, wherein the message type means a type of message of a set of message types, wherein the non-certified computer does not requires the certification by the government entity; determining, with the non-certified computer, whether the message type identifier was received; determining, with the non-certified computer, that the message type identifier was not received, then identifying the message type; determining, with the non-certified computer, whether the first data includes data configured to be transmitted off the vehicle; determining, with the non-certified computer, that the first data includes data configured to be transmitted off the vehicle, then, using the message type identifier, at least one of encoding, encrypting, and compressing at least a portion of the first data to create the downlink data; causing transmission of the downlink data from the non-certified computer to the CMU; determining, with the non-certified computer, that the first data does not include data configured to be transmitted off the vehicle, then, using the message type identifier, at least one of decoding, decrypting, and decompressing the at least a portion of the first data to create the uplink data; and causing transmission of the uplink data from the non-certified computer to the CMU.

In some aspects, the techniques described herein relate to an apparatus for processing uplink data or downlink data, the apparatus including: a non-certified computer including at least one memory circuit communicatively coupled to at least one processor circuit, wherein the non-certified computer does not require certification by a government entity, wherein the non-certified computer is configured to be communicatively coupled to a communications management unit (CMU) circuitry that is configured to be mounted in a vehicle, configured to route data between components of the vehicle, and requires the certification by the government entity; wherein the non-certified computer is configured to be mounted in the vehicle, and is further configured to: receive, on the non-certified computer in a vehicle and from the CMU circuitry, first data including either (a) a message of a message type or (b) (i) information configured to form or extracted from the message of the message type and (ii) a message type identifier, wherein the message type means a type of message of a set of message types; determine, with the non-certified computer, whether the message type identifier was received; determine, with the non-certified computer, that the message type identifier was not received, then identifying the message type; determine, with the non-certified computer, whether the first data includes data configured to be transmitted off the vehicle; determine, with the non-certified computer, that the first data includes data configured to be transmitted off the vehicle, then, using the message type identifier, at least one of encode, encrypt, and compress at least a portion of the first data to create the downlink data; transmit the downlink data from the non-certified computer to the CMU circuitry; determine, with the non-certified computer, that the first data does not include data configured to be transmitted off the vehicle, then, using the message type identifier, at least one of decode, decrypt, and decompress the at least a portion of the first data to create the uplink data; and transmit the uplink data from the non-certified computer to the CMU circuitry.

BRIEF DESCRIPTION OF THE DRAWINGS

Comprehension of embodiments of the invention is facilitated by reading the following detailed description in conjunction with the annexed drawings, in which.

In accordance with common practice, the various described features are not drawn to scale but are drawn to emphasize features relevant to the present disclosure. Reference characters denote like elements throughout figures and text.

DETAILED DESCRIPTION

Figure 1:
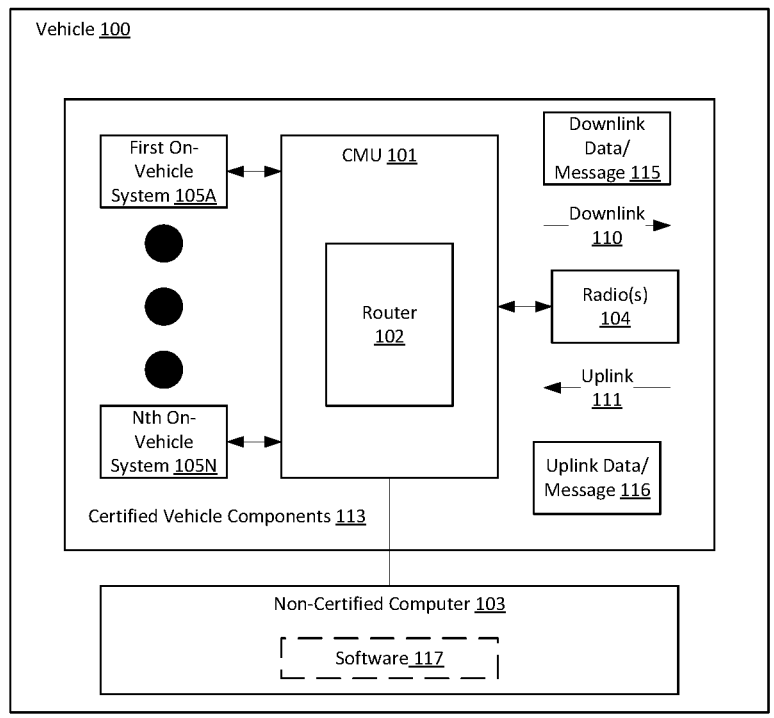
FIG. 1 is a block diagram illustrating one embodiment of a non-certified computer communicatively coupled to certified vehicle components.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the invention provide an improvement to the technological field of vehicles, e.g., aircraft, by permitting more rapid modification of vehicle functionality, e.g., vehicle communications system functionality. Certain component(s) of a vehicle require certification by one or more government entities. Certification of a component by a government entity means that the component meets the requirements of the government entity. Functionality which is not directly involved in vehicle operation (and thus does not require government certification) may be transferred from certified component(s) to component(s), e.g., a non-certified computer, which does not require such certification. Because such functionality (which does not require government certification) is performed in a non-certified component(s), e.g., a non-certified computer, such functionality can be implemented or changed more rapidly than if it resided in certified component(s). As a result, costs for such implementations or changes are reduced. Further, flaws which could give rise to decreased vehicle safety can be rectified more rapidly. Vehicle, as used herein, may be an aircraft, a spacecraft, a ship, a boat, a submersible vehicle, or any other type of vehicle.

Optionally, in a vehicle, a non-certified computer is configured to be communicatively coupled to certified component(s). Optionally, such certified components including at least one on-vehicle system, a communications management unit (CMU), and at least one radio. Each of the at least one on-vehicle systems and the at least one radio are communicatively coupled to the CMU. The CMU is configured to route data, e.g., messages, between on-vehicle system(s) and off-vehicle system(s), and between on-vehicle components, e.g., between the at least one radio and the CMU and/or the at least one vehicle systems. For pedagogical purposes, embodiments of the invention will be illustrated with the CMU.

Optionally, the non-certified computer may be a laptop computer, a phablet, a tablet, or any other type of portable computing device. The non-certified computer is further configured to perform functions which do not require certification by government entities. Optionally, such functions include at least one of: (a) encryption and/or decryption, (b) compression and/or decompression, and (c) encoding and/or decoding. For pedagogical purposes, embodiments of the invention will be illustrated with a non-certified computer communicatively coupled to the CMU.

Optionally, the non-certified computer may be configured to perform certain aircraft functionality which is referred to as an electronic flight bag. An electronic flight bag is used by crews of commercial aircraft in lieu of paper products and tools, and can perform basic flight planning calculations, display digital documentation, e.g., navigational charts, operations manuals, and checklists.

FIG. 1 is a block diagram illustrating one embodiment of a non-certified computer 103 communicatively coupled to certified vehicle components 113. The non-certified computer 103 is configured to be communicatively coupled to the certified vehicle components 113 when located in the vehicle 100, e.g., in a cockpit of an aircraft.

The non-certified computer 103 may be implemented with a state machine (e.g., using at least one processor circuit communicatively coupled to at least one memory circuit) and/or a neural network. The non-certified computer 103 is configured to provide functionality which does not require certification by a government entity. Thus, certain functions previously incorporated in the CMU 101 may be implemented in the non-certified computer 103, e.g., in optional software 117 executed by the non-certified computer 103, and subsequently revised (timely and less expensively) because no approval is required by a government entity. For purposes of clarity, neither the optional software 117 executed by the non-certified computer 103 or the non-certified computer 103 require certification by a government entity.

FIG. 1 illustrates for pedagogical purposes that the certified vehicle components 113 include at least one on-vehicle system 105A, 105N, a CMU 101, and at least one radio (radio(s)) 104. The CMU 101 communicatively couples the at least one on-vehicle system 105A, 105N with the at least one radio 104.[1] The CMU 101 includes a router 102 and is configured, using the router 102, to route messages between the at least one other on-vehicle system (or on-vehicle system) 105A, 105N and at least one of the at least one radio 104. The CMU 101 may optionally include other functionality. The CMU 101 is implemented as a state machine, e.g., using at least one processor circuit communicatively coupled to at least one memory circuit. Optionally, the router 102 may be implemented as software stored in the at least one memory circuit and executed by the processor circuit. Optionally, the CMU 101 may be referred to as CMU circuitry.

[1] For purposes of clarity, the CMU 101 and the radio(s) 104 are on-the vehicle. On-the vehicle also means in-the vehicle.

For pedagogical purposes, the non-certified computer 103 is illustrated as being communicatively coupled to the CMU 101. The non-certified computer 103 may be communicatively coupled to the certified vehicle components 113, e.g., to the CMU 101, by wired (e.g., Ethernet or another wired communications technique) or wireless (e.g., Wi-Fi, Bluetooth, or another wireless communications technique) techniques.

Optionally, the at least one radio 104 facilitate communications between the vehicle and a vehicle traffic control center, e.g., an aircraft traffic control center, and/or an operations center, e.g., an airline operations center. Typically, the vehicle traffic control center and the operations center are each located remotely from the vehicle.

Messages sent from the vehicle (e.g., originating with component(s) in and/or of the vehicle 100, e.g., one or more of the certified vehicle components 113 and/or the non-certified computer 103) to a destination off the vehicle (e.g., the vehicle traffic control center and/or the operations center) are sent in a downlink path (or downlink) 110. Data or a message sent in the downlink path 110 is referred herein respectively as downlink data or a downlink message 115.

Messages sent to the vehicle (e.g., to component(s) in and/or of the vehicle 100, e.g., one or more of the certified vehicle components 113 and/or the non-certified computer 103) originating from a location off the vehicle (e.g., the vehicle traffic control center and/or the operations center) are sent in an uplink path (or uplink) 111. Data or a message sent in the uplink path 111 are referred herein respectively as uplink data or an uplink message 116.

Each on-vehicle system 105A, 105N may be a travel (or flight) management computer, a travel (or flight) management system, a multi-function control and display unit (MDCU), a line replaceable unit in the vehicle 100, or another type of on-vehicle system. Each radio may be a high frequency (HF) radio, a very high frequency (VHF) radio, a satellite communications radio, or any other type of radio.

Figure 2:
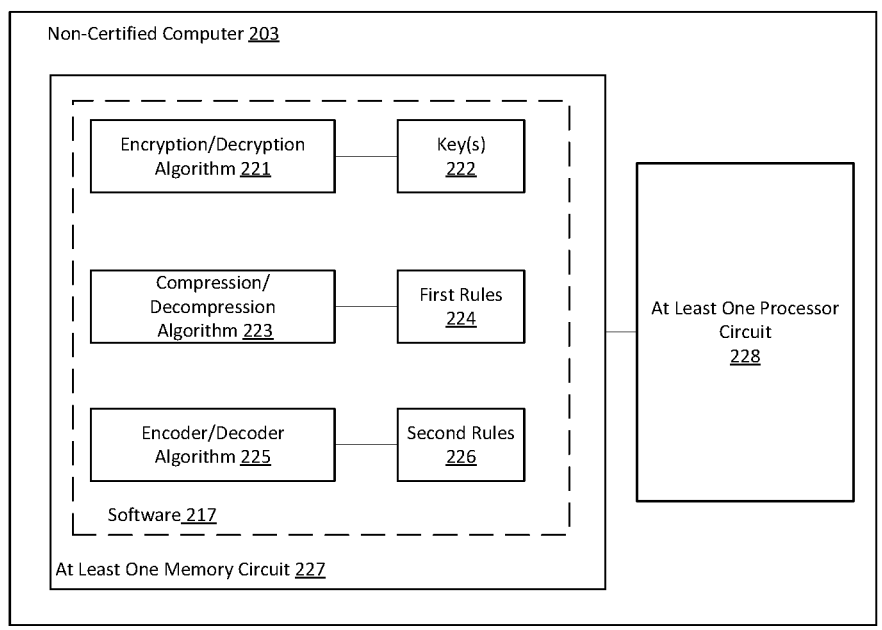
FIG. 2 illustrates a block diagram of one embodiment of a non-certified computer.

FIG. 2 illustrates a block diagram of one embodiment of a non-certified computer 203. Optionally, the non-certified computer 203 includes at least one of: (a) an encryption and/or decryption algorithm 221 and at least one key (keys(s)) 222. (b) compression and/or decompression algorithm 223 and first rules 224, and (c) encoder and/or decoder algorithm 225 and second rules 226. One or more of (a), (b), and (c) above may be used to form a downlink message and to extract an uplink message or data therefrom.

Encryption is used to obscure data sent in a message. Decryption is used to extract such obscured data from the message. Using the key(s) 222, the non-certified computer 203. e.g., the encryption and/or decryption algorithm 221, is configured to encrypt downlink messages and/or decrypt uplink messages. Optionally, one key may be used to encrypt downlink messages and/or decrypt uplink messages; alternatively and optionally, a first key may be used to encrypt downlink messages and/or a second key (different from the first key) may used to decrypt uplink messages.

Compression is used to diminish bandwidth consumed sending a message. As a result, message transmission costs are diminished. Decompression is used to extract an uncompressed message from a compressed message. Using the first rules, the non-certified computer 203, e.g., the compression and/or decompression algorithm 223, is configured to compress downlink messages and to decompress uplink messages.

Encoding transforms data from a first format into a second format, e.g., a message. Decoding transforms data from the second format to the first format. Optionally, the encoder and/or decoder algorithm 225 is configured to encode parameter data obtained from at least one of the certified vehicle components 113 into a downlink message having a standard format, e.g., specified by an industry standard or an Original Equipment Manufacturer (OEM). Optionally, examples of a standard format include an Aeronautical Radio Incorporated (ARINC) specification 618 format and an International Organization for Standardization (ISO) Open Systems Interconnection (OSI) bit oriented message format. Optionally, the encoder and/or decoder algorithm 225 is configured to decode an uplink message having an Aeronautical Radio Incorporated (ARINC) specification 618 format into parameter data for transmission to at least one of the certified vehicle components 113. Such downlink message and uplink message are configured to be respectively transmitted and received. Using the second rules 226, the non-certified computer 203, e.g., the encoder and/or decoder algorithm 225, is configured to encode downlink messages and/or decode uplink messages.

Because such algorithm(s) are in the non-certified computer 203, an owner of a vehicle 100 may utilize a unique, e.g., a customized, encryption and decryption algorithm, compression and decompression algorithm, and/or encoder and decoder algorithm. An algorithm may be rapidly changed to cure a flaw in the algorithm, e.g., which could give rise to a security breach and possibly endanger vehicle safety. For example, if there is a flaw in the encryption/decryption algorithm, then a third party may be able to extract the obscured data or even worse communicate encrypted data to a vehicle which could undermine safety of the vehicle. By being able to promptly update algorithm(s) performed by the non-certified computer 203, such safety issues can be promptly corrected. Optionally, the software 217 includes the encryption and/or decryption algorithm 221, the key(s) 222, the compression and/or decompression algorithm 223, the first rules 224, the encoder and/or decoder algorithm 225, and/or the second rules. For pedagogical purposes, FIG. 2 illustrates the software 217 resident in at least one memory circuit 227 of the non-certified computer 203 which is communicatively coupled to at least one processor circuit 228 of the non-certified computer 203. The software may be readily modified to update and/or correct technology therein. Optionally, such updates may be made on or off the vehicle 100.

Figure 3:
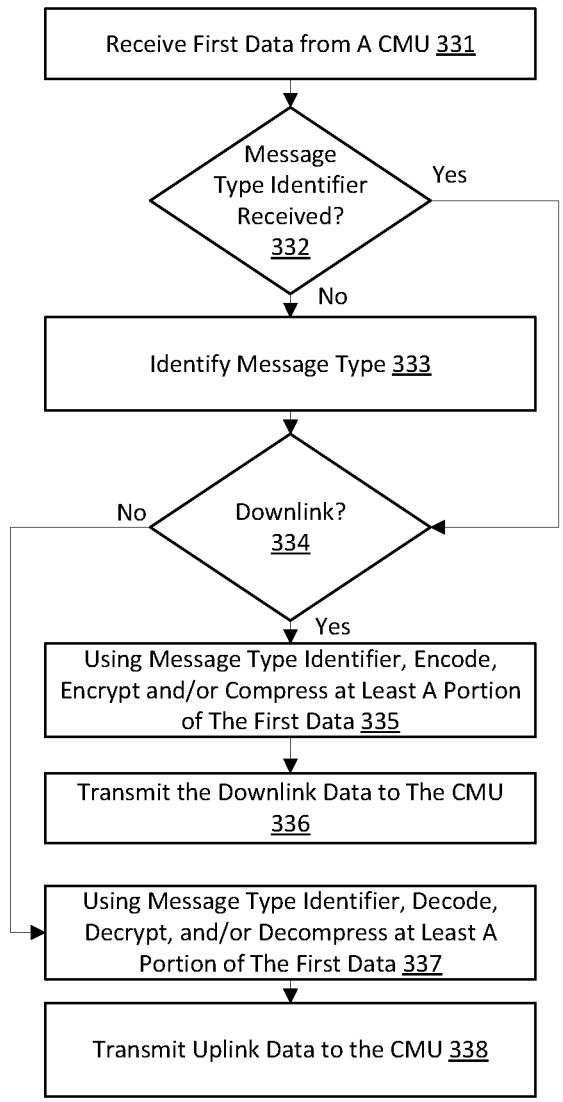
FIG. 3 illustrates one embodiment of a flow diagram of a method for processing, in a vehicle, downlink data from a communications management unit (CMU) or an uplink message from the CMU.

FIG. 3 illustrates one embodiment of a flow diagram of a method 330 for processing, in a vehicle, downlink data from a CMU 101 or an uplink message from the CMU 101. Optionally, method 330 is executed by software in the non-certified computer 103 communicatively coupled to the CMU 101. To the extent that the methods shown in any Figures are described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 331, first data comprising either (a) a message of a message type or (b) (i) information configured to form or be extracted from the message of the message type and (ii) an identifier of the message type. Message type means a type of message of a set of message types, e.g., a set of message types specified by a standard format.

In block 332, whether the message type identifier was received is determined. The message type identifier specifies a type of a message. Optionally, the message type of identifier is used to determine a characteristic of the message, e.g., whether it is an uplink or a downlink message. If the message type identifier was not received, then in block 333, the message type is identified, e.g., the message structure in the first data and/or parameters in the first data. Then, proceed to block 334. Structure of a message means how data in a message is organized.

If the message type identifier was received, then in block 334, determine whether the first data includes data configured to be transmitted in the downlink path 110, i.e., off the vehicle 100. If the first data does not include data configured to be transmitted in the downlink path 110, then proceed to block 337.

If the first data includes data configured to be transmitted in the downlink path 110, then in block 335, using the message type identifier, at least one of encode, encrypt, and compress at least a portion of the first data. The encoded, encrypted, and/or compressed at least a portion of the first data may be referred to as downlink data or if at least encoding is performed on the at least a portion of the first data, then the downlink data is referred to as a downlink message which is generated from such encoding. In block 336, the downlink data is transmitted to the CMU 101.

If the first data does not include data configured to be transmitted in the downlink path 110, then in block 337, using the message type identifier, at least one of decode, decrypt, and decompress at least a portion of the first data. The decoded, decrypted, and/or decompressed at least a portion of the first data may be referred to as uplink data or if at least decoding is performed on the at least a portion of the first data, then the uplink data is referred to as an uplink message which is generated from such decoding. In block 338, an uplink data is transmitted to the CMU 101.

The processor circuit(s) described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuit(s) described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods set forth herein can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

EXAMPLE EMBODIMENTS

Example 1 includes a method for processing uplink data or downlink data, the method comprising: receiving, at a non-certified computer configured to be mounted in a vehicle and from a communications management unit (CMU) configured to be mounted in the vehicle and to route data between components of the vehicle, and that requires certification by a government entity, first data comprising either (a) a message of a message type or (b) (i) information configured to form or extracted from the message of the message type and (ii) a message type identifier, wherein the message type means a type of message of a set of message types, wherein the non-certified computer does not require the certification by the government entity; determining, with the non-certified computer, whether the message type identifier was received; determining, with the non-certified computer, that the message type identifier was not received, then identifying the message type; determining, with the non-certified computer, whether the first data includes data configured to be transmitted off the vehicle; determining, with the non-certified computer, that the first data includes data configured to be transmitted off the vehicle, then, using the message type identifier, at least one of encoding, encrypting, and compressing at least a portion of the first data to create the downlink data; transmitting the downlink data from the non-certified computer to the CMU; determining, with the non-certified computer, that the first data does not include data configured to be transmitted off the vehicle, then, using the message type identifier, at least one of decoding, decrypting, and decompressing the at least a portion of the first data to create the uplink data; and transmitting the uplink data from the non-certified computer to the CMU.

Example 2 includes the method of Example 1, wherein the set of message types is specified by an industry standard or an Original Equipment Manufacturer.

Example 3 includes the method of any of Examples 1-2, wherein identifying the message type comprises identifying the message type using at least one of: a structure of a message in the first data and parameters in the first data.

Example 4 includes the method of any of Examples 1-3, wherein the at least one of encoding, encrypting, and compressing the at least a portion of the first data comprises encoding the at least a portion of the first data to create a downlink message.

Example 5 includes the method of any of Examples 1-4, wherein the vehicle comprises an aircraft.

Example 6 includes the method of any of Examples 1-5, wherein the non-certified computer is configured to transmit and receive respectively transmitted data and received data using a wireless technique.

Example 7 includes a non-transitory computer readable medium storing a program causing at least one processor of a non-certified computer to execute a process for processing uplink data or downlink data, the process comprising: receiving, at the non-certified computer configured to be mounted in a vehicle and from a communications management unit (CMU) configured to be mounted in the vehicle, configured to route data between components of the vehicle, and that requires certification by a government entity, first data comprising either (a) a message of a message type or (b) (i) information configured to form or extracted from the message of the message type and (ii) a message type identifier, wherein the message type means a type of message of a set of message types, wherein the non-certified computer does not requires the certification by the government entity; determining, with the non-certified computer, whether the message type identifier was received; determining, with the non-certified computer, that the message type identifier was not received, then identifying the message type; determining, with the non-certified computer, whether the first data includes data configured to be transmitted off the vehicle; determining, with the non-certified computer, that the first data includes data configured to be transmitted off the vehicle, then, using the message type identifier, at least one of encoding, encrypting, and compressing at least a portion of the first data to create the downlink data; causing transmission of the downlink data from the non-certified computer to the CMU; determining, with the non-certified computer, that the first data does not include data configured to be transmitted off the vehicle, then, using the message type identifier, at least one of decoding, decrypting, and decompressing the at least a portion of the first data to create the uplink data; and causing transmission of the uplink data from the non-certified computer to the CMU.

Example 8 includes the non-transitory computer readable medium of Example 7, wherein the set of message types is specified by an industry standard or an Original Equipment Manufacturer.

Example 9 includes the non-transitory computer readable medium of any of Examples 7-8, wherein identifying the message type comprises identifying the message type using at least one of: a structure of a message in the first data and parameters in the first data.

Example 10 includes the non-transitory computer readable medium of any of Examples 7-9, wherein the at least one of encoding, encrypting, and compressing the at least a portion of the first data comprises encoding the at least a portion of the first data to create a downlink message.

Example 11 includes the non-transitory computer readable medium of any of Examples 7-10, wherein the vehicle comprises an aircraft.

Example 12 includes an apparatus for processing uplink data or downlink data, the apparatus comprising; a non-certified computer comprising at least one memory circuit communicatively coupled to at least one processor circuit, wherein the non-certified computer does not require certification by a government entity, wherein the non-certified computer is configured to be communicatively coupled to a communications management unit (CMU) circuitry that is configured to be mounted in a vehicle, configured to route data between components of the vehicle, and requires the certification by the government entity; wherein the non-certified computer is configured to be mounted in the vehicle, and is further configured to: receive, on the non-certified computer in a vehicle and from the CMU circuitry, first data comprising either (a) a message of a message type or (b) (i) information configured to form or extracted from the message of the message type and (ii) a message type identifier, wherein the message type means a type of message of a set of message types; determine, with the non-certified computer, whether the message type identifier was received; determine, with the non-certified computer, that the message type identifier was not received, then identifying the message type; determine, with the non-certified computer, whether the first data includes data configured to be transmitted off the vehicle; determine, with the non-certified computer, that the first data includes data configured to be transmitted off the vehicle, then, using the message type identifier, at least one of encode, encrypt, and compress at least a portion of the first data to create the downlink data; transmit the downlink data from the non-certified computer to the CMU circuitry; determine, with the non-certified computer, that the first data does not include data configured to be transmitted off the vehicle, then, using the message type identifier, at least one of decode, decrypt, and decompress the at least a portion of the first data to create the uplink data; and transmit the uplink data from the non-certified computer to the CMU circuitry.

Example 13 includes the apparatus of Examples 12, wherein the set of message types is specified by an industry standard or an Original Equipment Manufacturer.

Example 14 includes the apparatus of any of Examples 12-13, wherein identifying the message type comprises identifying the message type using at least one of: a structure of a message in the first data and parameters in the first data.

Example 15 includes the apparatus of any of Examples 12-14, wherein the at least one of encoding, encrypting, and compressing the at least a portion of the first data comprises encoding the at least a portion of the first data to create a downlink message.

Example 16 includes the apparatus of any of Examples 12-15, further comprising the CMU circuitry which is further configured to be communicatively coupled to at least one on-vehicle system.

Example 17 includes the apparatus of any of Examples 12-16 wherein the vehicle comprises an aircraft.

Example 18 includes the apparatus of any of Examples 12-17, wherein the non-certified computer comprises one of a tablet, a phablet, and a laptop computer.

Example 19 includes the apparatus of any of Examples 12-18, wherein the non-certified computer is configured to transmit and receive respectively transmitted data and received data using a wireless technique.

Example 20 includes the apparatus of any of Examples 12-19, wherein the wireless technique is Wi-Fi.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for processing uplink data or downlink data, the method comprising:
receiving, at a non-certified computer configured to be mounted in a vehicle and from a communications management unit (CMU) configured to be mounted in the vehicle and to route data between components of the vehicle, and that requires certification by a government entity, first data comprising either (a) a message of a message type or (b) (i) information configured to form or extracted from the message of the message type and (ii) a message type identifier, wherein the message type means a type of message of a set of message types, wherein the non-certified computer does not require the certification by the government entity;
determining, with the non-certified computer, whether the message type identifier was received;
determining, with the non-certified computer, that the message type identifier was not received, then identifying the message type;
determining, with the non-certified computer, whether the first data includes data configured to be transmitted off the vehicle;

determining, with the non-certified computer, that the first data includes data configured to be transmitted off the vehicle, then, using the message type identifier, at least one of encoding, encrypting, and compressing at least a portion of the first data to create the downlink data;

transmitting the downlink data from the non-certified computer to the CMU;

determining, with the non-certified computer, that the first data does not include data configured to be transmitted off the vehicle, then, using the message type identifier, at least one of decoding, decrypting, and decompressing the at least a portion of the first data to create the uplink data; and transmitting the uplink data from the non-certified computer to the CMU.

2. The method of claim 1, wherein the set of message types is specified by an industry standard or an Original Equipment Manufacturer.

3. The method of claim 1, wherein identifying the message type comprises identifying the message type using at least one of: a structure of a message in the first data and parameters in the first data.

4. The method of claim 1, wherein the at least one of encoding, encrypting, and compressing the at least a portion of the first data comprises encoding the at least a portion of the first data to create a downlink message.

5. The method of claim 1, wherein the vehicle comprises an aircraft.

6. The method of claim 1, wherein the non-certified computer is configured to transmit and receive respectively transmitted data and received data using a wireless technique.

7. A non-transitory computer readable medium storing a program causing at least one processor of a non-certified computer to execute a process for processing uplink data or downlink data, the process comprising:

receiving, at the non-certified computer configured to be mounted in a vehicle and from a communications management unit (CMU) configured to be mounted in the vehicle, configured to route data between components of the vehicle, and that requires certification by a government entity, first data comprising either (a) a message of a message type or (b) (i) information configured to form or extracted from the message of the message type and (ii) a message type identifier, wherein the message type means a type of message of a set of message types, wherein the non-certified computer does not requires the certification by the government entity;

determining, with the non-certified computer, whether the message type identifier was received;

determining, with the non-certified computer, that the message type identifier was not received, then identifying the message type;

determining, with the non-certified computer, whether the first data includes data configured to be transmitted off the vehicle;

determining, with the non-certified computer, that the first data includes data configured to be transmitted off the vehicle, then, using the message type identifier, at least one of encoding, encrypting, and compressing at least a portion of the first data to create the downlink data;

causing transmission of the downlink data from the non-certified computer to the CMU;

determining, with the non-certified computer, that the first data does not include data configured to be transmitted off the vehicle, then, using the message type identifier, at least one of decoding, decrypting, and decompressing the at least a portion of the first data to create the uplink data; and causing transmission of the uplink data from the non-certified computer to the CMU.

8. The non-transitory computer readable medium of claim 7, wherein the set of message types is specified by an industry standard or an Original Equipment Manufacturer.

9. The non-transitory computer readable medium of claim 7, wherein identifying the message type comprises identifying the message type using at least one of: a structure of a message in the first data and parameters in the first data.

10. The non-transitory computer readable medium of claim 7, wherein the at least one of encoding, encrypting, and compressing the at least a portion of the first data comprises encoding the at least a portion of the first data to create a downlink message.

11. The non-transitory computer readable medium of claim 7, wherein the vehicle comprises an aircraft.

12. An apparatus for processing uplink data or downlink data, the apparatus comprising;

a non-certified computer comprising at least one memory circuit communicatively coupled to at least one processor circuit, wherein the non-certified computer does not require certification by a government entity, wherein the non-certified computer is configured to be communicatively coupled to a communications management unit (CMU) circuitry that is configured to be mounted in a vehicle, configured to route data between components of the vehicle, and requires the certification by the government entity;

wherein the non-certified computer is configured to be mounted in the vehicle, and is further configured to:

receive, on the non-certified computer in a vehicle and from the CMU circuitry, first data comprising either (a) a message of a message type or (b) (i) information configured to form or extracted from the message of the message type and (ii) a message type identifier, wherein the message type means a type of message of a set of message types;

determine, with the non-certified computer, whether the message type identifier was received;

determine, with the non-certified computer, that the message type identifier was not received, then identifying the message type;

determine, with the non-certified computer, whether the first data includes data configured to be transmitted off the vehicle;

determine, with the non-certified computer, that the first data includes data configured to be transmitted off the vehicle, then, using the message type identifier, at least one of encode, encrypt, and compress at least a portion of the first data to create the downlink data;

transmit the downlink data from the non-certified computer to the CMU circuitry;

determine, with the non-certified computer, that the first data does not include data configured to be transmitted off the vehicle, then, using the message type identifier, at least one of decode, decrypt, and decompress the at least a portion of the first data to create the uplink data; and transmit the uplink data from the non-certified computer to the CMU circuitry.

13. The apparatus of claim 12, wherein the set of message types is specified by an industry standard or an Original Equipment Manufacturer.

14. The apparatus of claim 12, wherein identifying the message type comprises identifying the message type using at least one of: a structure of a message in the first data and parameters in the first data.

15. The apparatus of claim 12, wherein the at least one of encoding, encrypting, and compressing the at least a portion of the first data comprises encoding the at least a portion of the first data to create a downlink message.

16. The apparatus of claim 12, further comprising the CMU circuitry which is further configured to be communicatively coupled to at least one on-vehicle system.

17. The apparatus of claim 12 wherein the vehicle comprises an aircraft.

18. The apparatus of claim 12, wherein the non-certified computer comprises one of a tablet, a phablet, and a laptop computer.

19. The apparatus of claim 12, wherein the non-certified computer is configured to transmit and receive respectively transmitted data and received data using a wireless technique.

20. The apparatus of claim 12, wherein the wireless technique is Wi-Fi.

* * * * *